May 21, 1935. G. KOSMA 2,002,403
FISHING REEL CONSTRUCTION
Filed Aug. 2, 1934
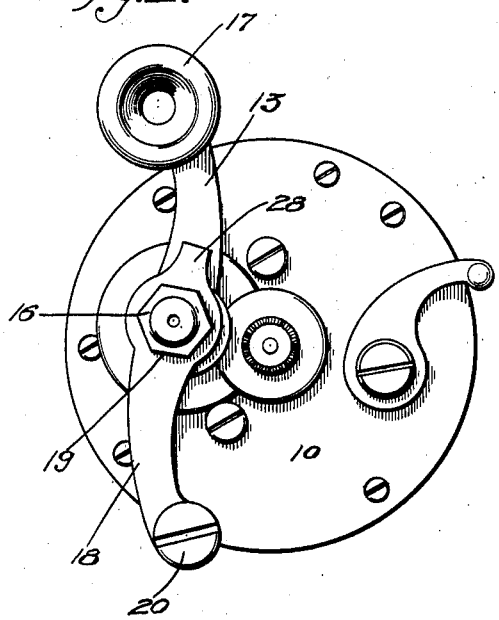
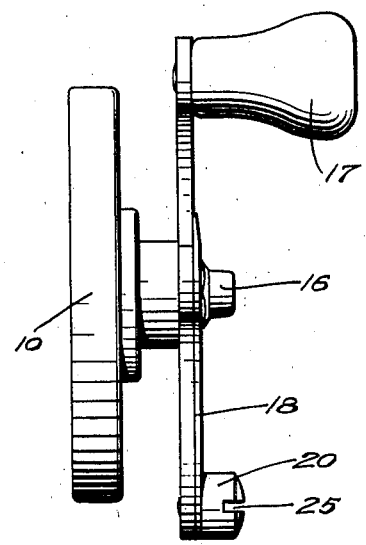
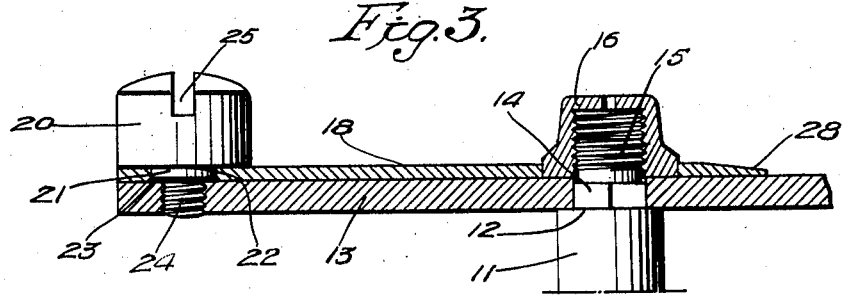
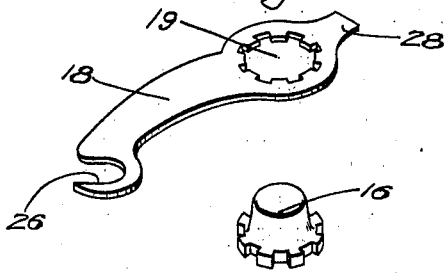
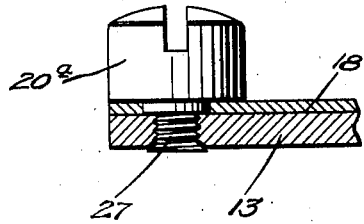
Inventor:—
Gustav Kosma
by his Attorneys
Howson & Howson Patented May 21, 1935

2,002,403

UNITED STATES PATENT OFFICE 2,002,403

FISHING REEL CONSTRUCTION

Gustav Kosma, Philadelphia, Pa., assignor to Ocean City Manufacturing Company, Philadelphia, Pa., a corporation of Pennsylvania Application August 2, 1934, Serial No. 738,125

7 Claims. (Cl. 74—548)

This invention relates to improvements in fishing reels and, more particularly, to an improvement in the construction of the operating handles by means of which the reel spool is rotated. Such reel handles are connected to a spindle which may be either the spindle of the spool or a spindle having driving connection therewith through gearing mounted in the reel head by means of a nut which jams the reel handle solidly against a shoulder on the spindle. The reel handle is, through excitement in manipulating the same in the landing of fish and rough treatment in general handling of fishing kits and the like, subjected to severe strains which tend, in turn, to place strains against the nut. The spindle in the majority of reels, and particularly in the larger or salt water fishing reels, is usually formed of some corrosion-resisting material and is usually soft with the result that the strains placed against the nut have a tendency to displace the threads and make the nut more readily loosened. It is further essential from time to time to remove the reel handle in oiling and cleaning the reel and repeated removals make the threads loose so that the nut is readily removed, with the result that, as the nut becomes loose, the rapid rotation of the reel handle has a tendency to cause the same to become unseated and often drop off and be lost, rendering the reel useless until a new nut can be obtained. Furthermore, due to the untidy condition in which most fishing kits are maintained, it is often difficult to locate a wrench by means of which the nut may be removed and such wrenches are often lost entirely.

An important object of this invention is the provision of a wrench which is so associated with the reel handle that it may not be lost and that it acts as a lock for the nut, preventing rotation thereof with relation to the spindle.

A more specific object of the invention is the provision in a construction of this character of an arrangement such that the counterbalance weight automatically employed on multiplying reel handles may act as a means for securing the wrench in position.

A further object of the invention is the provision of a construction wherein the counterweight, while functioning in the manner just described, is so connected with the reel handle that it may not be disengaged therefrom.

A further object of the invention is the provision of a construction wherein the counterweight may act as a head for the wrench so that, while a relatively thin material is employed in the construction of the wrench, a broad surface is provided for the engagement of the fingers.

A further object of the invention is the provision of a wrench functioning in the manner above described and which incorporates an extension providing a screw driver which may be employed in tightening the many screws employed in the construction of the fishing reels.

These and other objects are attained by the construction shown in the accompanying drawing wherein, for the purpose of illustration, I have shown preferred embodiments of my invention, and wherein Fig. 1 is a plan view of a reel head embodying my invention;

Fig. 2 is a side elevation thereof;

Fig. 3 is an enlarged sectional view showing the mounting of the reel handle and of one form of counterweight;

Fig. 4 is a perspective view showing a slightly modified wrench and nut; and

Fig. 5 is a detail sectional view showing the mounting of the counterweight for use in connection with the wrench of Fig. 4.

Referring now more particularly to the drawing, the numeral 10 generally designates the reel head, mounting a rotatable spindle 11 shouldered as at 12 to provide a seat for a reel handle 13. An extension is provided beyond the shoulder, that portion of the extension lying within the reel handle being polygonally formed as indicated at 14 and the remainder thereof being threaded as at 15 for the reception of a nut 16. The nut 16 may assume any of a plurality of forms being illustrated as hexagonal in Fig. 1 and as spanner type in Fig. 4. The outer surface of the reel handle is made flat and is provided at one end with the usual operating knob 17. Overlying the opposite end of the central portion of the handle is a wrench 18 having an opening 19 conforming to the shape of nut 16. The wrench is formed to conform with the shaping of the end of the reel handle which it overlies and is secured in position by means of the balance weight 20 employed to equalize the weight of the operating knob 17.

The connection between the counterweight and the wrench, which holds the wrench in its proper position with relation to the handle, may assume a variety of forms. In Fig. 3, the lower face of the counterweight is provided with an extension 21 rotatably directed through an opening 22 in the wrench and having its lower end slightly peened over the bottom surface of the wrench as at 23 so that, while the counterweight may be rotated, it may not be separated from the wrench. The extension has a threaded stud 24 for engagement in a threaded opening formed in the reel handle and it will be obvious that by rotating the counterweight, which is provided with a screw slot 25 for this purpose, the wrench may be disengaged to permit its use in removal of nut 10. Screw slot 25 is preferably made of such width that a coin may be utilized in lieu of the screw driver, an implement which is often missing from fishing kits.

In the form shown in Figs. 4 and 5, the outer shank end of the wrench is formed with a slot 26 opening through one side thereof and arcuately curved on the axis of the opening 19 as a center. The counterweight 20a has an unthreaded shank portion succeeded by a threaded portion 27 which is threaded through the reel handle and then upset so that it may not be again withdrawn therefrom. The threaded portion is, however, of sufficient length that the counterweight may have a slight movement with relation thereto, so that it may clamp the wrench shank against the reel handle to hold the same in position.

Either of the wrenches just described may be provided with a slight extension 28 forming a screw driver. This extension is preferably provided upon the head end of the wrench and overlies the operating end of the reel handle, being tapered in thickness as shown in order that it may be sufficiently reduced to enable its use as a screw driver and, at the same time, closely approaching the surface of the reel handle and thus eliminate any danger of damage to the hands of the operator during operation thereof.

Since the construction is capable of considerable modification, I do not wish to be understood as limiting myself to those forms here illustrated except as hereinafter claimed.

I claim:

1. In a reel, a rotatable spindle having a shoulder, a reel handle seated against said shoulder, a nut to clamp the reel handle against the shoulder, a wrench overlying the reel handle and shaped to conform thereto and having an opening receiving the nut, and means to hold the wrench against rotation with relation to the reel handle.

2. In a reel, a rotatable spindle having a shoulder, a reel handle seated against said shoulder, a nut to clamp the reel handle against the shoulder, a wrench overlying the reel handle and shaped to conform thereto and having an opening receiving the nut, and means to hold the wrench against rotation with relation to the reel handle comprising a counterbalance for the reel handle.

3. In a reel, a rotatable spindle having a shoulder, a reel handle seated against said shoulder, a nut to clamp the reel handle against the shoulder, a wrench overlying the reel handle and shaped to conform thereto and having an opening receiving the nut, and means to hold the wrench against rotation with relation to the reel handle comprising a counterbalance for the reel handle permanently connected with one of said wrench and reel handle.

4. In a reel, a rotatable spindle having a shoulder, a reel handle seated against said shoulder, a nut to clamp the reel handle against the shoulder, a wrench overlying the reel handle and shaped to conform thereto and having an opening receiving the nut, and means to hold the wrench against rotation with relation to the reel handle, said wrench having an extension likewise overlying the reel handle and flatly conforming thereto, said extension comprising a screw driver.

5. The construction as claimed in claim 2 wherein the counterbalance is permanently rotatably associated with the wrench and has threaded engagement with the reel handle.

6. The construction as set forth in claim 2 wherein the counterbalance has threaded engagement with the reel handle permitting limited movement thereof, the shank of the wrench having a slot to receive an extension of the counterbalance whereby it may be moved from a position underlying the counterbalance to a position where it is disposed to one side thereof.

7. In a reel, a rotatable spindle having a shoulder, a reel handle seated against said shoulder, a nut to clamp the reel handle against the shoulder, and means to lock the nut against rotation with relation to the spindle comprising a counterbalance for the reel handle.

GUSTAV KOSMA.